United States Patent
Müller et al.

(10) Patent No.: US 6,992,040 B2
(45) Date of Patent: Jan. 31, 2006

(54) PROCESS FOR PREPARING A SHELL-TYPE CATALYST

(75) Inventors: Herbert Müller, Altrip (DE); Stefan Bösing, Mainz (DE); Walter Behl, Blankenbach (DE)

(73) Assignee: Degussa AG, Düsseldorf (DE)

(*) Notice: Subject to any disclaimer, the term of this patent is extended or adjusted under 35 U.S.C. 154(b) by 0 days.

(21) Appl. No.: 10/628,425

(22) Filed: Jul. 29, 2003

(65) Prior Publication Data

US 2005/0143257 A1    Jun. 30, 2005

Related U.S. Application Data

(63) Continuation of application No. 09/158,398, filed on Sep. 22, 1998, now abandoned.

(30) Foreign Application Priority Data

Sep. 30, 1997    (DE) ................ 197 43 100

(51) Int. Cl.
*B01J 21/00* (2006.01)
*B01J 23/00* (2006.01)
*B01J 20/00* (2006.01)

(52) U.S. Cl. ............ 502/327; 502/243; 502/261; 502/262; 502/263; 502/325; 502/326; 502/330; 502/332; 502/333; 502/334; 502/339; 502/344; 502/347; 502/348; 502/349; 502/350; 502/351; 502/355; 502/407; 502/414; 502/415; 502/439

(58) Field of Classification Search ........ 502/243, 502/261, 262, 263, 325, 326, 327, 330, 332, 502/333, 334, 339, 344, 347, 348, 349, 350, 502/351, 355, 407, 414, 415, 439, 32; 501/133; 427/215–217, 229, 383.1, 383.3, 383.5, 383.7, 427/435, 436, 443.2

See application file for complete search history.

(56) References Cited

U.S. PATENT DOCUMENTS

| | | | |
|---|---|---|---|
| 4,212,824 A * | 7/1980 | Seagraves ............... 564/417 |
| 4,764,498 A | 8/1988 | Wissner |
| 4,835,131 A * | 5/1989 | DeJong ................. 502/255 |
| 4,900,712 A * | 2/1990 | Bar-Ilan et al. ......... 502/304 |
| 5,039,643 A | 8/1991 | Hecht |
| 5,179,061 A * | 1/1993 | Haerle ................. 502/339 |
| 5,208,206 A * | 5/1993 | Yasaki et al. ........... 502/334 |
| 5,212,130 A * | 5/1993 | Addiego et al. .......... 502/60 |
| 5,506,067 A * | 4/1996 | Tinker .................. 429/27 |
| 5,723,403 A | 3/1998 | Durand |
| 5,779,915 A * | 7/1998 | Becker et al. ........... 210/757 |
| 5,874,166 A * | 2/1999 | Chu et al. .............. 428/368 |
| 5,900,386 A * | 5/1999 | Freund et al. ........... 502/330 |

FOREIGN PATENT DOCUMENTS

| | | |
|---|---|---|
| DE | 3200483 A1 | 8/1983 |
| EP | 0 407 809 A1 | 1/1991 |
| EP | 0 636 412 A | 2/1995 |
| JP | 54-157507 | 12/1979 |

* cited by examiner

*Primary Examiner*—Cam N. Nguyen
(74) *Attorney, Agent, or Firm*—Smith, Gambrell & Russell, LLP

(57) ABSTRACT

A process for preparing a shell-type catalyst which comprises applying to a substantially nonporous inorganic support material having a BET surface area of <80 $m^2/g$, a catalytically active outer shell of a suspension containing at least one water soluble noble metal compound and a substantially water insoluble coating compound, drying the suspension onto the support material, and activating the coated support material in a reducing gas stream.

25 Claims, 2 Drawing Sheets

PROCESS FOR PREPARING A SHELL-TYPE CATALYST

CROSS REFERENCE TO RELATED APPLICATIONS

This is a continuation of U.S. patent application Ser. No. 09/158,398, filed Sep. 22, 1998 now abandoned, which in turn claims priority to German patent application no. 197 43 100.3, filed Sep. 30, 1997. Both applications are incorporated herein in their entirety by reference.

FIELD OF INVENTION

The invention relates to a process for preparing a shell-type catalyst in which a nonporous inorganic support material with a low BET surface area is provided with a catalytically active outer shell, based on German patent application No. 197 43 100.3, filed on Sep. 30, 1997, the contents of which is hereby incorporated by reference thereto.

BACKGROUND

Metals, suitably noble metals, are used in many industrial processes for catalytic purposes, in elemental form or as oxides on a support. Porous or non-porous materials may be used as catalyst supports.

When impregnating support materials with aqueous metal salt solutions and then reducing the salt, the metal may be deposited onto the support in the form of an outer shell which completely encases the support. These shell-type catalysts are particularly suitable, such as for selective hydrogenations and for oxidation reactions using oxygen in the gas phase.

One area of application of particular interest is the selective hydrogenation of acetylene, in particular the purification of a hydrogen chloride gas stream in the oxychlorination process circuit for preparing vinyl chloride. Vinyl chloride is prepared from 1,2-dichloroethane, either purely thermally or in the presence of catalysts at elevated temperature, with the elimination of hydrogen chloride. After isolating most of the vinyl chloride, the resulting hydrogen chloride gas generally contains up to 3,000 ppm v/v of acetylene. Before returning this hydrogen chloride to the oxychlorination process, in an intermediate stage as much as possible of the unwanted acetylene has to be removed from the gas mixture. This is carried out by catalytic hydrogenation, wherein the essential requirement is the removal of as much of the acetylene as possible (residual acetylene concentration <30 ppm v/v) by selective hydrogenation of the acetylene to give ethylene which can be used in the oxychlorination process. The process conditions for purification of the hydrogen chloride gas stream mentioned above are described in detail in European patent No. 0052,271 B1 and U.S. Pat. No. 4,388,278. Hydrogenation is generally performed with a clear excess of hydrogen in the temperature range 120° C.–180° C., at a pressure of from 6 to 20 bar absolute.

Fixed bed catalysts are used to purify the hydrogen chloride gas stream by selective hydrogenation of the acetylene contained therein. This is suitably carried out in the presence of palladium-containing catalysts. Catalyst formulations on aluminum oxide have been disclosed for this use but they are restricted with regard to performance potential/selectivity and durability.

A fixed bed catalyst is described in German patent No. 3,037,047 C2, which is prepared by impregnating a silicon carbide support with a solution of a palladium salt, and then drying and reducing the palladium salt with hydrogen. This involves the use of a relatively expensive support material.

European patent No. 576,944 A1 discloses shell-type catalysts prepared by depositing an alloy by PVD (physical vapor deposition) and/or chemical vapor deposition (CVD) on a molded article.

Nonporous molded articles made of glass, quartz glass, ceramic, titanium dioxide, zirconium dioxide, aluminum oxide, aluminum silicates, borates, steatite, magnesium silicate, silicon dioxide, silicates, metal, carbon, e.g. graphite, or mixtures of these materials can be used as supports. The alloy layer deposited on the molded article contains at least one metal which is suitably very easily oxidized, such as silicon, aluminum, zirconium or titanium. The thickness of the layer is suitably from 100 nm to 50 μm.

Finally, European patent No. 755,718 A1 describes a process for preparing loaded nonporous support materials in which nonporous inorganic support materials can be coated with metal and/or metal oxide in an abrasion-resistant manner by applying highly dilute, aqueous solutions of at least one metal compound to the heated molded article in such a way that the water evaporates immediately and then optionally calcining at elevated temperature.

German patent No. 3,200,483 A1 discloses a process for preparing silica-containing molded articles in which a mixture of soluble and insoluble silicas are applied to an inorganic substrate. The resulting molded articles can be used as supports for a variety of catalytic materials.

A catalyst for use in the case of hydrogen chloride gas purification by selective hydrogenation of acetylene has also been described, with silicon dioxide used as the support material (Chem.-Ing.-Tech. 59 (1987) No. 8, pp 645–647). This catalyst is, like the other formulations, limited with regard to its performance (space velocity characteristics).

SUMMARY OF THE INVENTION

An object of the patent invention is to provide a process for preparing a shell-type catalyst in which a nonporous inorganic support material with a low specific surface area (BET) surface area of <80 m$^2$/g is provided with a catalytically active outer shell, which enables the production in a simple manner of a catalyst which can be used for the application mentioned by way of example, even at elevated space velocities (GHSV) of >3000/h).

Accordingly the present invention comprises a process for preparing a shell-type catalyst which comprises applying to the above mentioned substantially nonporous inorganic support material a catalytically active outer shell of a suspension containing at least one water soluble noble metal compound and a substantially water insoluble coating compound, drying the suspension onto the support material, and activating the coated support material in a reducing gas stream.

It is particularly surprising that by the use of the process of the present invention, it is possible to coat a nonporous support material with a catalytically active material and coating material at the same time in a single step. This advantageous surface-active structure is obtainable in accordance with the present invention in a surprisingly simple manner.

The method of the present invention and those disclosed in the published prior art for shell-type catalysts differ considerably from each other. Thus, in European patent No. 576,944 the deposition of a noble metal alloy is achieved by means of PVD or CVD in a high vacuum, both requiring relatively costly technologies and apparatus.

In European patent No. 755,718 A1 water-soluble metal compounds or metal salts with a metal concentration of 2% wt., are deposited onto support materials in a moving bed, with the additional condition that the solvent water has to be evaporated immediately. In contrast to the process disclosed in European patent No. 755,718, according to the present invention suspensions of a water-soluble material and a substantially water-insoluble material are dried onto a nonporous support. The shell-type catalyst produced in this manner probably has a different structure, but the coated shell-type catalyst is always particularly simple to produce.

Nonporous inorganic support materials which can be coated by the process of the present invention include in particular granulates, molded articles or ceramic supports. Good results can be obtained with ceramic supports, especially those from alumina and/or silicates. Furthermore, the very wide variety of aluminum silicates, aluminum oxide itself, silicon carbide with added aluminum oxide and silicon dioxide, zirconium dioxide with and without added aluminum oxide and silicon dioxide, titanium dioxide with and without aluminum oxide and silicon dioxide, for example corundum, feldspar, mica, steatite, ceramic stoneware, glass, quartz etc. are particularly suitable.

In a specific embodiment, the process in the present invention employs molded articles made of glass, quartz, ceramic, silicon dioxide, aluminum oxide, graphite, molded carbon, metal or steatite as support materials. Of these, molded articles based on $SiO_2$ and/or $Al_2O_3$ are again of particular interest.

$SiO_2$ granulates with different granular sizes are of great interest as support materials in the process of the present invention.

The materials which can be used as supports for the shell-type catalyst prepared according to the invention can have a very wide variety of external shapes. For instance they can be granules, molded articles in the form of spheres, tablets and/or strands. In one expedient variant of the process according to the invention, support materials in the form of hollow extrudates, solid extrudates, spheres, granules, tablets and/or strands are used. The support materials can also be used as an extrudate, as a hollow extrudate, as tubular sections, as rings or in the shape of discs.

In one embodiment of the present invention granular materials are coated. Good to very good shell-type preparations have also been obtained especially on ceramic materials (aluminosilicates), with the present invention.

Support materials which are capable of rolling may be of advantage, depending on the ultimate purpose of the shell-type catalysts. Spheres are particularly suitable for such purposes.

The particle diameter of the support materials to be coated is usually not critical and may vary over a wide range. The supports suitably have a particle diameters of from about 0.5 to about 50 mm. Particle diameters of from about 1 to about 20 mm are particularly suitable. In one embodiment of the present invention particle diameters of >1 mm are most suitable. On some occasions particle diameters of <0.5 mm can also be useful, depending on the purpose of their use.

The BET surface area of the inorganic support materials to be provided with an outer shell according to the present invention is less than 80 m²/g, which means that the support is non-porous. It is especially expedient that support materials with a BET surface area of <30 m²/g, suitably <10 m²/g are used.

In addition to the BET surface area of the support material, the pore volume is of some significance in a particularly suitable embodiment of the process of the present invention. Thus in one advantageous embodiment of the process in the invention support materials with a pore volume of <0.5 ml/g are used. Support materials with a pore volume of <0.1 ml/g are particularly suitable. As used throughout the specification and the claims, when referring to the catalytic support material "substantially nonporous" means that the material suitably has a BET surface of about <10 m²/g, and suitably a pore volume of about <0.5 ml/g.

In a particularly suitable embodiment of the non-porous inorganic support materials in the shell-type catalysts being prepared according to the invention has a very low concentration of $Fe_2O_3$, wherein concentrations of about <0.5% wt., based on the support material, are most suitable.

In preparing a shell-type catalyst in accordance with the present invention, in a first step a water soluble noble metal compound is dried on the support material together with the coating material. As used throughout the specification and the claims, "water soluble" refers to compounds at least of 0.01% wt., suitably of 0.05% wt. calculated as metal, of which can be dissolved in water at 30° C. These noble metal compounds suitably include water-soluble compounds of Ru, Rh, Pd, Ag, Os, Ir, Pt and/or Au.

Suitably oxides, hydroxides, carbonates, halides, nitrates, salts of organic acids and/or other common complex compounds which contain noble metal ions are used. Water soluble noble metal compounds can also include acids, such as for example hexachloro-palladium solutions. Most suitably palladium containing noble metal salt solutions are used according to the invention, especially palladium chloride and palladium nitrate solutions are employed.

Any noble metal concentration of the water soluble noble metal compounds can be used in the process of the present invention. Thus one factor is the availability of the materials, but most suitably in the process in the invention a water-soluble noble metal compound is used as an aqueous solution containing the noble metal compound, calculated as metal, at a concentration of about >1% wt. Suitably noble metal solutions can be used with a concentration of about >5% noble metal, calculated as metal. Solutions which have a concentration of about <1% wt. of noble metal have to be used in unusually large amounts. This results in an extended drying time to achieve the corresponding noble metal concentration in the catalyst shell. As mentioned above, the soluble noble metal compounds which are used according to the invention are suitably those which can dissolve in water at 30° C. at a concentration, calculated as the metal, of at least 0.01% wt.

In contrast, coating compounds which are substantially insoluble in water which are dried onto the support material at the same time as the water-soluble noble metal compound are those compounds which can suitably dissolve in water at 30° C. at a concentration, calculated as metal, of about <4% wt. These coating compounds are characterized by their poor solubility in water, which results in the production of a suspension which is applied in the first step. Therefore, as used throughout the specification and the claims, "water insoluble" means that the material so characterized has a solubility in water at 30° C. of about <4% wt.

Finely divided inorganic metal oxides are included among the water insoluble coating materials which can be used according to the invention. $SiO_2$, $Al_2O_3$, $TiO_2$ and/or $ZrO_2$ are suitably employed. $SiO_2$ and $Al_2O_3$ are particularly suitable from among these, especially $SiO_2$.

Materials with an average agglomerate size range up to about 15 μm, suitably with an agglomerate size of from about 2 μm to about 10 μm are used to produce the outer shell in the shell-type catalyst which is prepared according to the invention Particularly suitable is finely divided silica with an agglomerate size range of from about 3 μm to about 7 μm.

Larger agglomerates/particles are generally not particularly advantageous for the preparation since they cannot form homogeneous, firmly adhering, abrasion-resistant shells, as a result of their size.

The suitable water insoluble metal oxides have a surface area of from about 50 $m^2/g$ to about 500 $m^2/g$, suitably from about 100 to about 300 $m^2/g$ and a compacted density (according to DIN/ISO 787/11XI, JISK 5101/18) from about 10 g/l to about 800 g/l, suitably from about 50 to about 500 g/l. Particularly appropriate are silicas which have the surface areas and compacted densities mentioned above.

The shell-type catalysts prepared with these metal oxides are largely homogeneous, as demonstrated by their scanning electron microscope photographs, exhibit no troughs apart from macro indentations (in which the coating materials can accumulate), and also do not produce cracks at the surface of the support. A largely homogeneous granular structure can be detected at very high magnifications. The thickness of the outer shell on shell-type catalysts prepared according to the invention can be very accurately controlled over a wide range, suitably of from about 0.1 μm to about 20 μm. From about 0.5 to about 10 μm being particularly suitable. Most suitably the shell has a thickness of >1 μm.

The ratio of the noble metal compound which is soluble in water to the coating compound which is substantially insoluble in water, can be varied over a wide range in the suspension to be dried onto the support material. In a particularly suitable process according to the invention the water soluble noble metal compound and the substantially water insoluble coating compound are each used in a weight ratio calculated as metal, of noble metal compound to coating compound of from about 0.1:1 to about 5:1. A weight ratio of from about 0.5:1 to about 2:1 is particularly suitable. The noble metal compound, based on the weight of the entire shell-type catalyst, is suitably used in a weight ratio calculated as metal, in the range of from about 0.0001:1 to about 0.02:1. Most suitably the coating compound, with respect to the total weight of shell-type catalyst and calculated as metal, is used in a weight ratio of from about 0.0005:1 to about 0.04:1.

The concentration of metal, particularly palladium or platinum, in the shell-type catalyst, as it is prepared by the process according to the invention, is suitably at most 1% wt. metal, in particular in the range between about 0.1% wt. and about 0.5% wt. metal. Metal content, in particular palladium content, of <0.1% wt. are not meaningful since the catalyst can lose noble metal as a result of abrasion under prevailing conditions and under process conditions at which such low noble metal contents would produce too short a service life. Noble metal contents higher than 1% wt. are also not particularly useful since these can lead to unwanted thickening of the noble metal layer, associated with a reduction in adhesion as a result of the very low surface area of the support material, and an increased performance potential cannot be achieved in this manner. The concentration of coating materials in the shell preparations according to the invention is suitably in the range from about 0.05 to about 1% wt., expressed as metal. The concentration is particularly suitably from about 0.05 to about 0.5% wt., expressed as metal, based on the total weight of catalyst. A surprisingly good adhesive effect is obtained when using this order of magnitude of the suitably finely divided coating material.

In accordance with the second step of the process of the invention, the shell formulations are converted to activated shell-type catalysts in a reducing gas stream. In this treatment one of the alloy components is selectively reacted with a gas or a gas mixture at an elevated temperature. Suitably a gas stream containing hydrogen is used for activation.

It is possible to add adhesion promoters, such as water glass, which are familiar to a person skilled in the art to improve the adhesion between support and material to be dried., These are added to the suspension and applied to the support in the same process step. In the same way, it is also possible to add doping compounds, to the suspension to facilitate specific effects relating to the activity/selectivity of the catalyst.

The invention also concerns a catalytic process for the removal of acetylene from a hydrogen chloride gas stream by the selective hydrogenation of acetylene in the gas stream by using the shell-type catalysts prepared by the process of the present invention. The shell-type catalysts which can be prepared by the present invention are particularly advantageously used in gas streams for the purification of hydrogen chloride gas in the manufacture of vinyl chloride by oxychlorination.

A shell-type catalyst is suitably obtained by the present invention by drying a suspension of a noble metal salt solution, suitably a palladium salt solution, with a substantially water insoluble finely divided material, suitably silica, onto a support material having a low specific surface area and then activating the coating by reducing it with a reducing gas, suitably a hydrogen-containing gas. The product of the process of the present invention has activity and selectivity at high space velocities of up to 8000/h, suitably of from about 2000 to about 6000/h, for the purification of a hydrogen chloride gas stream by selective hydrogenation of the acetylene therein to produce ethylene.

Particularly suitable for process conditions in the catalytic hydrogenation of the hydrogen chloride gas include a temperature range of from about 100° C. to about 200° C., suitably from about 100° C. to about 160° C.; a pressure of the hydrogen chloride gas stream (process pressure) of from about 1 to about 15 bar absolute, suitably 6 to about 12 bar, depending on the process pressure for oxychlorination; residence time of from about 2 to about 15 sec (under the operating conditions and with an empty tube); and a hydrogen to acetylene ratio of from about 1:1 to about 6:1, suitably from about 2:1 to about 4:1.

BRIEF DESCRIPTION OF THE DRAWING

The invention is explained in more detail below by examples and with reference being had to the enclosed drawings wherein.

DETAILED DESCRIPTION

Figure 1:
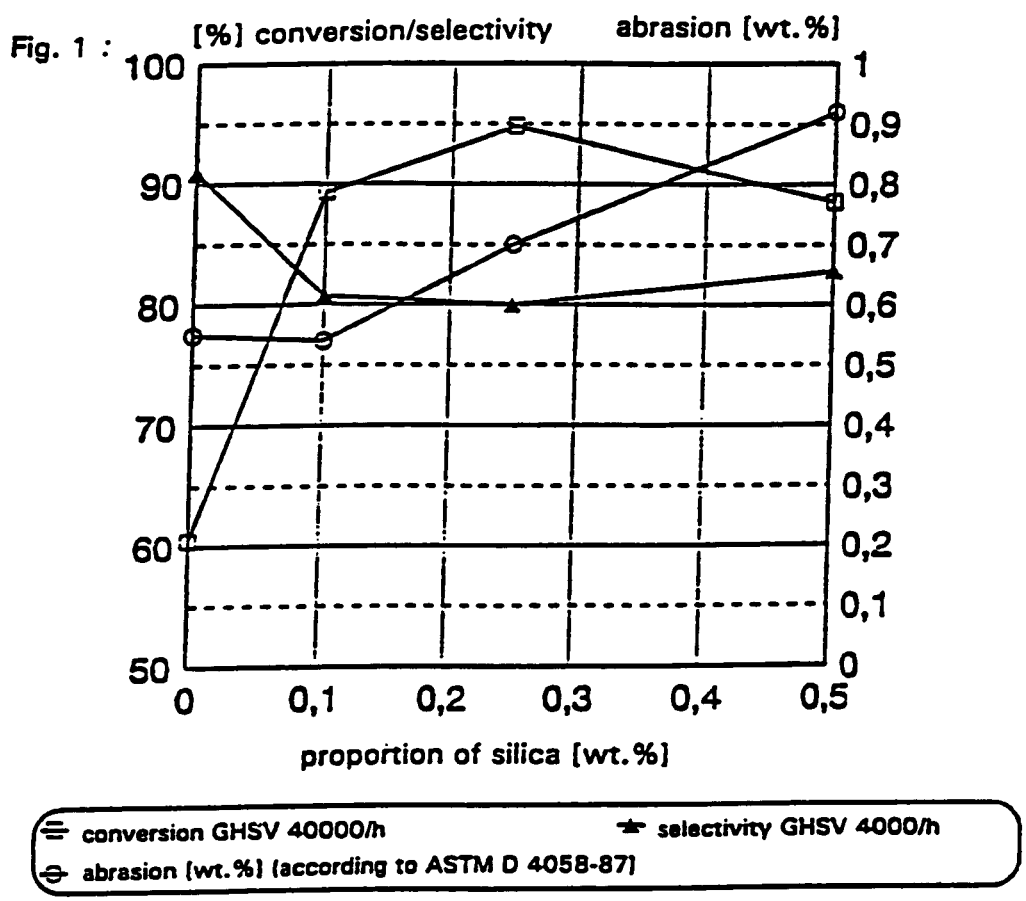
FIG. 1: diagrammatically shows the conversion/selectivity/abrasion characteristics of the shell-type catalyst according to the present invention as a function of the proportion of the insoluble coating material component.

FIG. 1 shows the variation of performance potential (conversion/selectivity) and abrasion of a shell-type catalyst in accordance with the invention, prepared by applying a palladium salt solution onto an $SiO_2$ granulate with a granularity of 3–5 mm, with concentration of silica with an average agglomerate size of 7 µm. The conversion and selectivity data were determined in a laboratory test apparatus at 130° C. The test gas used had the composition of 0.5% hydrogen/0.2% acetylene/99.3% nitrogen. FIG. 1 clearly shows that, at concentrations of >0.25% wt. of silica, a clear increase in abrasion occurs without producing a substantial increase in conversion or selectivity. From silica concentrations of 0.1% wt., substantial increases in conversion and increased space velocity are indicated compared to a catalyst without added silica. Thus the particularly suitable proportion of silica in this catalyst is 0.1–0.3% wt. based on the weight of catalyst.

A shell-type catalyst with the composition described of 0.1–1% wt. Pd and 0.1–1% wt. silica on a non-porous $SiO_2$ support with granularity of 3–5 mm, and a low surface area of <1 $m^2/g$ has a very high activity and selectivity at space velocities of up to 8000/h, suitably 2000–6000/h, during the selective hydrogenation of acetylene in a hydrogen chloride gas stream under the process conditions described above.

The increased activity of the catalyst according to the invention is a result of improved fine distribution of the noble metal integrated into the suitably applied silica shell. The silica brings about this fine distribution effect by promoting an enlargement of the surface area of the catalytically active coating shell only. In comparison, in porous impregnated support materials the additional reactive centers at the surface of the support provide an additional potential for unwanted secondary reactions.

The shell-type catalyst of the present invention has an extended activity potential. For example high acetylene conversions are achieved in a GHSV range of up to 8000/h during hydrogen chloride gas purification. The selectivity to give ethylene is more than 60%.

When preparing the shell-type catalysts of the present invention, drying of the suspension of the noble metal salt, suitably a palladium salt, and finely divided coating material, suitably silica, with the ultimate production of a homogeneous shell is suitably performed in a moving bed; i.e. the suspension of noble metal salt and silica is thoroughly mixed with the support and the solvent water is removed by distillation with external heating.

As a result of the method of preparation and the production of a surface shell, the addition of various doping and adhesion promoting substances is also very easy and is associated with corresponding effects on shell modification and performance characteristics. Suitable dopants are known from e.g. D. L. Trimm, Design of Industrial Catalysts, Elsevier Scientific Publ. Comp., 1980, pp. 229 et seq.

Preparing the Catalyst on an Industrial Scale
Control 1

Standard Catalyst Without Added Silica

This catalyst is prepared in a moving bed. An $SiO_2$ granular material which has been washed with caustic and then washed acid-free is initially placed in the preparation drum. The amount corresponding to 0.15% wt. Pd based on the weight of the catalyst, of palladium chloride solution is added to the drum with the continuous passage of a stream of nitrogen. The palladium salt solution is dried onto the support in the rotating drum by passing pressurized steam (140° C.) through the external jacket of the preparation drum. Reduction is achieved by passage of an excess amount of hydrogen through the periodically rotating preparation drum. The stream of hydrogen is finally replaced by a stream of nitrogen in the subsequent cooling phase.

The catalyst obtained by this method of preparation has a grey/glossy but thin external noble metal shell of <1 µm.

EXAMPLE 1

Shell-type Catalyst

In a different manner than the preparation of the standard catalyst in Control 1, preparation of the shell-type catalyst is started in this example by introducing 0.5 t dry $SiO_2$ granules. Then the amount of dry silica corresponding to 0.25% wt. of the catalyst is introduced to the preparation drum. An amount of palladium nitrate solution corresponding to 0.15% wt. of the catalyst is then added to the preparation drum. After a period of action under nitrogen in a rotating drum, drying is performed at 140° C. in the same way as in Control 1. Reduction is achieved by introducing forming gas (5% hydrogen in nitrogen) into the bed of dried catalyst.

The catalyst obtained has a deep black color and has a mat finish. Table 1 compares the physical properties of the catalysts described in Control 1 and Example 1.

TABLE 1

| Parameters: | Catalyst according to Control 1 -standard catalyst- | Catalyst according to Example 1 -shell-type catalyst- |
| --- | --- | --- |
| Pd conc. [% wt.] | 0.15 | 0.15 |
| Proportion of silica [% wt.] | 0 | 0.25 |
| Appearance | grey/glossy | mat/black |
| Abrasion [% wt.] ASTM D 4058-87 | 0.2–0.3 | 0.4–0.5 |
| BET surface area [$m^2/g$] | no adsorption | <1 |
| CO-adsorption [$10^{-2}$ ml/g] | 0.3 | 1.25 |

Performance Comparison of Control 1 and Example 1

The catalysts prepared in accordance with Control 1 and Example 1 were compared with regard to their conversion and selectivity potential in a pilot plant.

The pilot plant is incorporated as a bypass reactor unit in an existing hydrogenation unit for purification of the hydrogen chloride gas stream within a vinyl chloride production plant, so that a hydrogen chloride gas stream containing up to 2000 ppm of acetylene can be passed directly over the catalyst. Two reactors are installed in parallel so that, a reference control catalyst can be tested in one reactor while new development can be introduced in the parallel connected reactor. Thus, a direct comparison is possible under varying plant conditions and with varying quality of the hydrogen chloride. The reactors are designed so that they can be filled with 2 l of the catalyst. They are heated by heating coils containing pressurized steam. Hydrogen can be added in flexible amounts via a rotameter and each reactor has a temperature measuring device (in the middle of the catalyst bed) which can be used for temperature regulation.

The maximum volume of hydrogen chloride which can be passed through each reactor is 16 $Nm^3/h$. After emerging from the reactors, the reaction gas can be supplied separately to a gas chromatography unit for analysis.

Performance Comparison

The catalysts described in Control 1 and Example 1 were tested for several months in the pilot plant under varying conditions. Among others, the requirement for primary performance comparison was to fix the rate of conversion and then to determine the corresponding space velocity as a direct measure of performance. The comparable settings are given in Tables 2 and 3.

TABLE 2

Settings I

| Quantity compared | Catalyst according to Control 1 -standard catalyst- Reactor A | Catalyst according to Example 1 -shell-type catalyst- Reactor B |
|---|---|---|
| Running time [weeks] | 8 | 8 |
| Temperature | 130 | 130 |
| $H_2:C_2H_2$ ratio | 2 | 2 |
| Conversion of $C_2H_2$ [%] | 90 | 91 |
| Selectivity to give $C_2H_4$ [%] | 51 | 63 |
| GHSV [1/h] | 750 | 4500 |

TABLE 3

Settings II

| Quantity compared | Catalyst according to Control 1 -standard catalyst- Reactor A | Catalyst according to Example 1 -shell-type catalyst- Reactor B |
|---|---|---|
| Running time [weeks] | 12 | 12 |
| Temperature | 130 | 135 |
| $H_2:C_2H_2$ - molar ratio | 2 | 2 |
| Conversion of $C_2H_2$ [%] | 70 | 73 |
| Selectivity to give $C_2H_4$ [%] | 52 | 61 |
| GHSV [1/h] | 1500 | 6000 |

The performance comparison in Tables 2 and 3 for fixed conversion shows clearly the increased performance potential of the shell-type catalyst in accordance with this invention in the particular application of hydrogen chloride gas purification. The shell-type catalyst can be used at 4–6 times higher space velocities to produce the same ethylene selectivity.

Conversion/Selectivity Characteristics

The conversion and selectivity characteristics of the catalysts described in Control 1 and Example 1 were determined at different space velocities and are summarized in Table 4.

TABLE 4

Basic settings: Temperature (middle of bed) is 130° C.; molar ratio of $H_2:C_2H_2 = 2$

| Catalyst according to comparison Control 1 -standard catalyst- Reactor A | | | Catalyst according to Example 1 -shell-type catalyst- Reactor B | | |
|---|---|---|---|---|---|
| GHSV | Conversion of $C_2H_2$ [%] | Selectivity to give $C_2H_4$ [%] | GHSV | Conversion of $C_2H_2$ [%] | Selectivity to give $C_2H_4$ [%] |
| 750 | 90 | 52 | 2250 | 100 | 39 |
| 1000 | 82 | 57 | 4500 | 91 | 63 |
| 1500 | 70 | 52 | 6000 | 73 | 61 |

TABLE 4-continued

Basic settings: Temperature (middle of bed) is 130° C.; molar ratio of $H_2:C_2H_2 = 2$

| Catalyst according to comparison Control 1 -standard catalyst- Reactor A | | | Catalyst according to Example 1 -shell-type catalyst- Reactor B | | |
|---|---|---|---|---|---|
| GHSV | Conversion of $C_2H_2$ [%] | Selectivity to give $C_2H_4$ [%] | GHSV | Conversion of $C_2H_2$ [%] | Selectivity to give $C_2H_4$ [%] |
| | | | 2250 | 60 | 64 |
| | | | 6000 | 16 | 60 |

Figure 2:
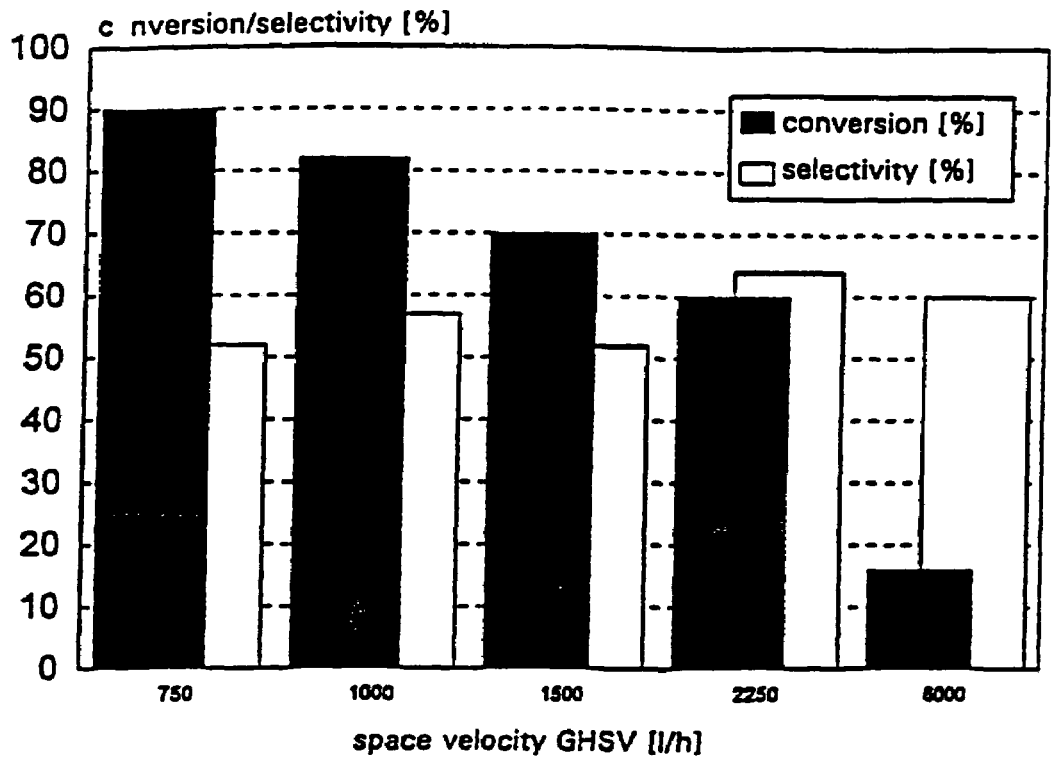
FIG. 2: diagrammatically shows the conversion/selectivity of the catalyst of Control 1 as a function of space velocity.
Figure 3:
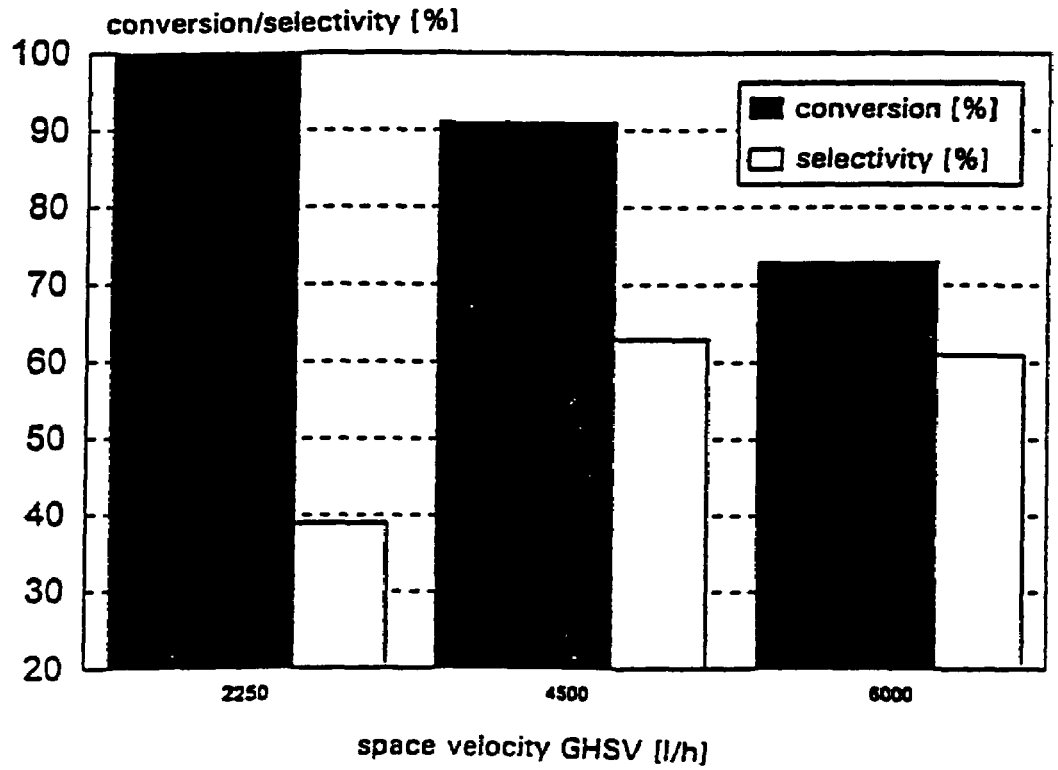
FIG. 3: is a diagrammatical showing of the conversion/selectivity of the catalyst in accordance with the present invention, according to Example 1 (shell-type catalyst) as a function of space velocity.

The conversion/selectivity characteristics of the shell-type catalyst according to the invention show in FIGS. 1 and 2 that when compared with a standard catalyst of the prior art, much higher space velocities can be used without incurring a decrease in conversion. In the high GHSV range from 4000/h upwards very advantageous, suitable conversion and selectivity combinations are produced.

What is claimed is:

1. A process for preparing a shell-type catalyst comprising:
   a) applying a suspension to a substantially nonporous inorganic support material having a BET surface area of less than 80 m²/g and a diameter of 0.5 mm to 50 mm, the suspension consisting essentially of:
      (i) at least one water soluble catalytically active metal compound; and
      (ii) a substantially water insoluble coating compound selected from the group consisting of: $SiO_2$, $Al_2O_3$, $TiO_2$ and $ZrO_2$;
   b) drying said suspension onto said support material; and
   c) activating in a reducing gas stream.

2. The process according to claim 1, wherein said support material comprises a granulate or molded article of at least one member selected from the group consisting of glass, quartz, ceramic, silica, alumina, graphite, molded carbon, metal and steatite.

3. The process according to claim 2, wherein said molded article comprises at least one member selected from the group consisting of a hollow extrudate, solid extrudate, sphere, granule, tablet and strand.

4. The process according to claim 1, wherein said support material comprises a molded article of at least one member selected from the group consisting of $SiO_2$ and $Al_2O_3$.

5. The process according to claim 1, wherein the BET surface of said support material is less than 10 m²/g.

6. The process according to claim 1, wherein said substantially nonporous support material has a pore volume of less than 0.5 ml/g.

7. The process according to claim 1, wherein said substantially nonporous support material has a pore volume of less than 0.1 ml/g.

8. The process according to claim 1, wherein said support material has an $Fe_2O_3$ content of less than 0.5% wt.

9. The process according to claim 1, wherein said water soluble catalytically active metal compound is a water soluble noble metal compound selected from the group consisting of Ru, Rh, Pd, Ag, Os, Ir, Pt and Au.

10. The process according to claim 9, wherein said water soluble metal compound is in the form of an oxide, hydroxide, carbonate, halide, nitrate, salt of an organic acid or a complex.

11. The process according to claim 9, wherein said suspension contains greater than 1% wt. aqueous solution of said water soluble noble metal compound calculated as the metal.

12. The process according to claim 9, wherein said suspension contains >5% wt. aqueous solution of said water soluble noble metal compound, calculated as the metal.

13. The process according to claim 9, wherein at least 0.01% wt. of said noble metal compound, calculated as the metal, is soluble in water at 30° C.

14. The process according to claim 9, wherein the weight ratio of said water soluble noble metal compound to said insoluble coating compound calculated as the metal is from 0.1:1 to 5:1.

15. The process according to claim 14, wherein the weight ratio of said noble metal compound to said insoluble coating compound is between 0.5:1 and 2:1.

16. The process according to claim 9, wherein the weight ratio of said noble metal compound, calculated as the metal, to the total weight of the shell-type catalyst is between 0.0001:1 and 0.02:1.

17. The process according to claim 1, wherein the maximum average agglomerate size of said substantially water insoluble coating compound is 15 $\mu$m.

18. The process according to claim 1, wherein the agglomerate size of said substantially water insoluble coating compound is 3 $\mu$m to 7 $\mu$m.

19. The process according to claim 1, wherein the BET surface area of said water insoluble coating compound is from 50 m$^2$/g to 500 m$^2$/g.

20. The process according to claim 1, wherein the compacted density of said insoluble coating compound is from 10 g/l to 800 g/l.

21. The process according to claim 1, wherein the weight ratio of the coating compound to the total weight of the shell-type catalyst, calculated as the metal, is between 0.005:1 and 0.04:1.

22. The process according to claim 1, wherein the thickness of the coating shell of the catalyst is from 0.1 $\mu$m to 20 $\mu$m.

23. The process according to claim 1, wherein the concentration of the water soluble metal component, calculated as the metal, is from 0.1% wt. to 1% wt. based on the catalyst.

24. The process according to claim 1, wherein the concentration of the water insoluble coating material, calculated as the metal, is from 0.05% wt. to 1% wt. based on the catalyst.

25. The process according to claim 1, wherein said reducing gas stream contains hydrogen.

* * * * *